US011334125B1

(12) United States Patent
Crisp et al.

(10) Patent No.: US 11,334,125 B1
(45) Date of Patent: May 17, 2022

(54) INFORMATION HANDLING SYSTEM VISUALLY DYNAMIC BEZEL

(71) Applicant: Dell Products L.P., Round Rock, TX (US)

(72) Inventors: Richard Andrew Crisp, Austin, TX (US); Wei-Ti Kuo, Taipei (TW); Richard William Guzman, Austin, TX (US); Zackery William Bennett, Austin, TX (US)

( * ) Notice: Subject to any disclaimer, the term of this patent is extended or adjusted under 35 U.S.C. 154(b) by 0 days.

(21) Appl. No.: 17/081,714

(22) Filed: Oct. 27, 2020

(51) Int. Cl.
*G06F 1/18* (2006.01)
*G06F 1/20* (2006.01)

(52) U.S. Cl.
CPC .............. *G06F 1/182* (2013.01); *G06F 1/181* (2013.01); *G06F 1/20* (2013.01); *G06F 1/206* (2013.01)

(58) Field of Classification Search
CPC . G06F 1/182; G06F 1/181; G06F 1/20; G06F 1/206
See application file for complete search history.

(56) References Cited

U.S. PATENT DOCUMENTS

| | | | | |
|---|---|---|---|---|
| 5,514,036 A * | 5/1996 | Lin | ..................... | G11B 33/1446 55/471 |
| 5,673,029 A * | 9/1997 | Behl | ..................... | G11B 33/142 |
| 7,320,524 B2 * | 1/2008 | Lee | ..................... | G03B 21/16 454/367 |
| 7,499,275 B2 * | 3/2009 | Lai | ..................... | H05K 7/20181 361/695 |
| 10,788,868 B1 | 9/2020 | Crisp et al. | | |
| 2007/0289776 A1 * | 12/2007 | Liang | ..................... | H05K 9/0041 174/383 |
| 2008/0204996 A1 * | 8/2008 | Sun | ..................... | H05K 7/20727 361/694 |
| 2008/0253068 A1 * | 10/2008 | Hisatsune | ..................... | H05K 7/20172 361/678 |
| 2011/0234065 A1 * | 9/2011 | Chang | ..................... | G06F 1/182 248/205.1 |
| 2012/0322357 A1 * | 12/2012 | Zhang | ..................... | G06F 1/181 454/339 |
| 2014/0362529 A1 * | 12/2014 | Tsuchida | ..................... | H05K 7/20127 361/690 |
| 2017/0336758 A1 * | 11/2017 | Watanabe | ..................... | B41J 2/1714 |
| 2020/0333856 A1 * | 10/2020 | Quijano | ..................... | G06F 1/182 |

OTHER PUBLICATIONS

U.S. Appl. No. 29/690,149, filed May 6, 2019, entitled "Information Handling System Bezel Having Multi-Angled Reflective Surfaces," by inventors Guzman et al.

* cited by examiner

*Primary Examiner* — Nidhi Thaker
(74) *Attorney, Agent, or Firm* — Zagorin Cave LLP; Robert W. Holland (57) ABSTRACT

An information handling system bezel provides a dynamic visual effect with layers of patterns coupled to the information handling system housing that provide a dynamic visual effect for an end user as the end user viewing angle changes. For example, an outer layer of the bezel has a first pattern, such as parallel vent lines, an inner layer of the bezel has a second pattern, such as geometric shapes, and a middle layer has both the first and second patterns aligned with the outer and inner layers to provide the dynamic visual effect based upon viewing angle through the outer layer to the inner layer, such as with a contrasting color of the first and/or second patterns at the middle layer.

17 Claims, 8 Drawing Sheets

INFORMATION HANDLING SYSTEM VISUALLY DYNAMIC BEZEL

BACKGROUND OF THE INVENTION

Field of the Invention

The present invention relates in general to the field of information handling systems, and more particularly to an information handling system visually dynamic bezel.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems that have a desktop, tower or server configuration tend to be set up in a location and remain in that location for the life of the product. Generally, the systems have a practical design with a housing having an aesthetically pleasing front face and ports to interface with peripheral devices disposed at a rear face out of sight. Typically, the system housing includes a power button and a manufacturer icon or name at the front face. In some cases, the housing may include illumination indicators that show system state, such as power, memory access, and LEDs that provide information for debugging of failures. Generally, a front face of a desktop configuration will include vents to accept a cooling airflow that exhausts at the rear face of the housing. Although manufacturers typically attempt to have the front face present an aesthetically acceptable appearance, generally the designs tend to have a utilitarian appearance. Often the front face is provided by a bezel that couples to the housing to cover the functional aspects of the housing with an aesthetic appearance. Although information handling systems include components that are active and dynamic as they cooperate to process information, the outer appearance offered by conventional bezels tend to be static.

SUMMARY OF THE INVENTION

Therefore, a need has arisen for a system and method which provides a visual dynamic effect at an information handling system bezel.

In accordance with the present invention, a system and method are provided which substantially reduce the disadvantages and problems associated with previous methods and systems for covering a front face of an information handling system. A bezel has three layers that include patterns so that a dynamic visual effect is created by interaction of the patterns at changing viewing angles relative to a front face of the bezel.

More specifically, an information handling system processes information with processing components disposed in a housing, such as a CPU that executes instructions and interfaces with a memory that stores the instructions and information. A bezel couples to a front face of the housing to provide a dynamic visual effect as a viewing angle relative to the front face of the housing changes. For example, the bezel has an outer layer with a first pattern, an inner layer with a second pattern and a middle layer disposed between the outer and inner layers that has both the first and second patterns. The first and second patterns of the middle layer align with the first and second patterns of the outer and inner layers so that visibility of inner layer and middle layer adjusts based upon a viewing angle at the front face of the bezel. In one example embodiment, the middle layer has a color different than the inner and outer layers, such as a blue that contrasts against a dark gray or black. The first pattern may be a first vent configuration, such as parallel spaced lines, and the second pattern may be a second vent configuration, such as hexagon or other geometric shapes.

The present invention provides a number of important technical advantages. One example of an important technical advantage is that a visually aesthetic effect is provided at an information handling system bezel in a passive manner that does not involve active processing or external indications, such as LED or other illuminations. As an end user moves relative to the bezel, an impression of movement is generated as a visual effect that provides an aesthetically appealing appearance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system bezel provides a visually dynamic effect based upon a viewing angle of an end user at the bezel. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
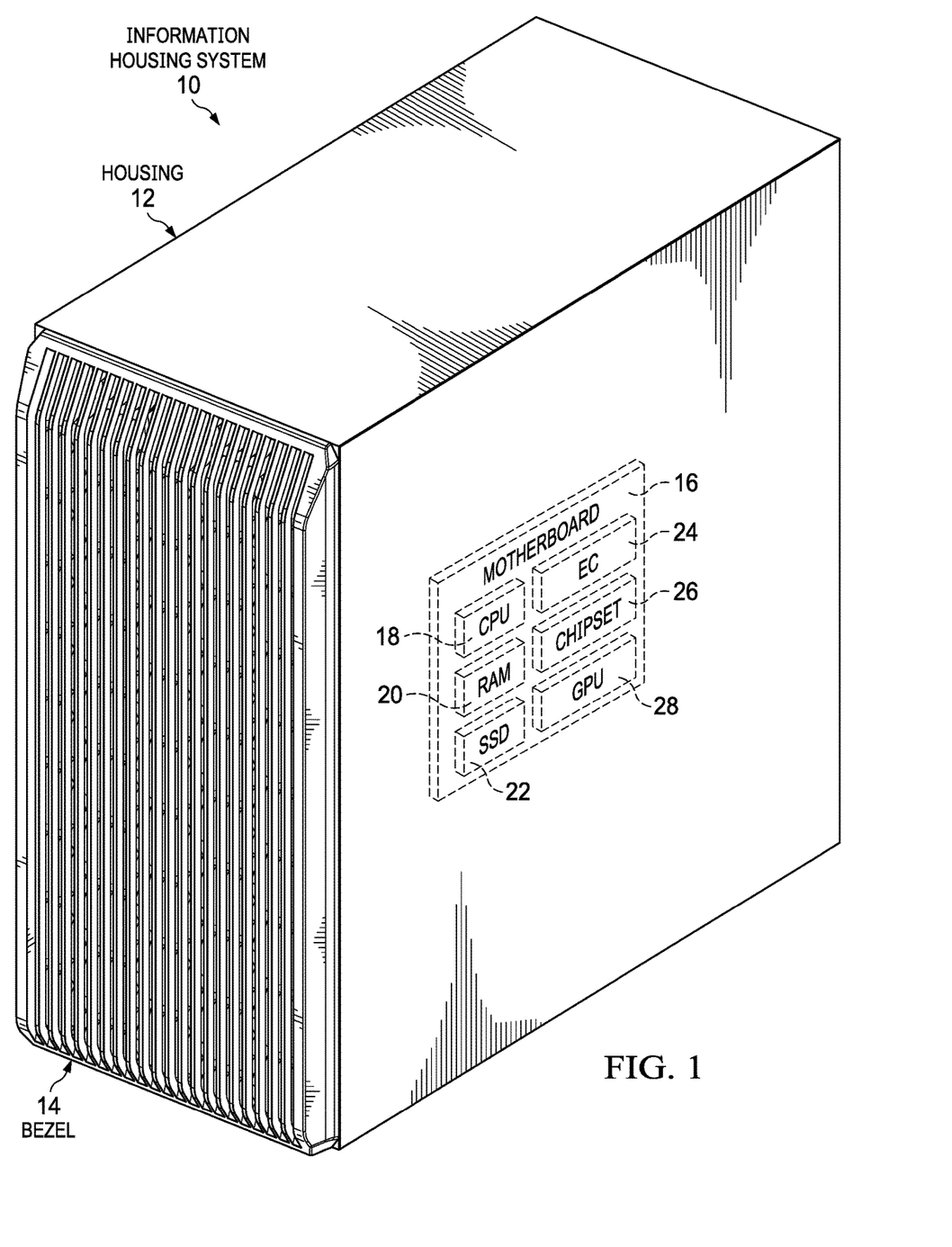
FIG. 1 depicts a side cutaway view of an information handling system having a bezel coupled to a front face to provide a visually dynamic appearance.

Referring now to FIG. 1, a side cutaway view depicts an information handling system 10 having a bezel 14 coupled to a front face of a housing 12 to provide a visually dynamic appearance. In the example embodiment, information handling system 10 has a tower or desktop configuration with a standalone housing that interacts with an end user through peripheral devices, such as a keyboard and display interfaced through ports located at a rear face opposite bezel 14. Within housing 12, processing components couple to a motherboard 16 to cooperatively communicate and process information. For example, a central processing unit (CPU) 18 executes instructions to process information with the instructions and information stored in a random access memory (RAM) 20. A solid state drive (SSD) 22 provides persistence storage of the instructions and information, such as by storing an operating system and applications in flash memory. An embedded controller 24 manages physical systems at the processing components, such as power, cooling and interactions with input/output devices. A chipset 26 supports operations of CPU 18, such as memory access and interactions with a graphics processor unit (GPU) 28 that generates pixel values for presentation of visual images at a display. Although FIG. 1 depicts a stationary configuration, in various embodiments bezel 14 may be integrated with portable information handling systems or other types of devices.

Figure 2:
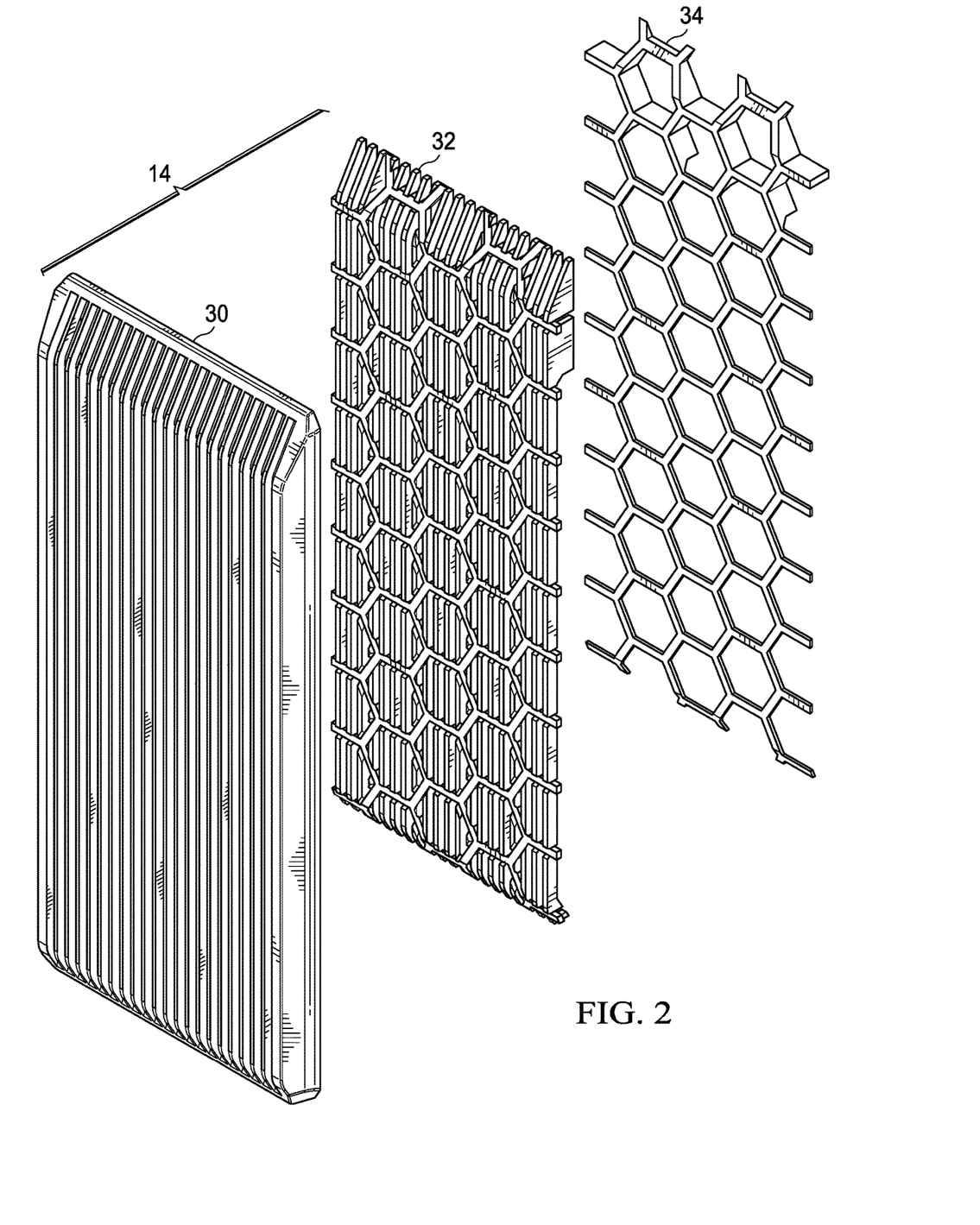
FIG. 2 depicts an upper perspective exploded view of the bezel having three separate coupled layers that create a dynamically visual appearance.

Referring now to FIG. 2, an upper perspective exploded view depicts bezel 14 having three separate coupled layers that create a dynamically visual appearance. In the example embodiment, an outer layer 30 has a first pattern that presents parallel vertical venting lines at a front face of an information handling system. An inner layer 34 has a second pattern that presents geometric hexagonal shapes behind the front face provided by outer layer 30. A middle layer 32 is coupled between outer layer 30 and inner layer 34 and includes both the first pattern of outer layer 30 and second pattern of inner layer 34 to create the dynamic visual effect based upon end user viewing angle at the front face of an information handling system. In the example embodiment, middle layer 32 aligns a first pattern of parallel vertical venting lines with the lines of outer layer 32, and also aligns hexagonal geometric shapes of the second pattern with those of inner layer 34. As an example, outer layer 30, middle layer 32 and inner layer 34 are manufactured from hard plastic with injection molding as three separate pieces that are assembled at an information handling system front face. The interactions of the first and second patterns define the visually dynamic effect from different viewing angles towards the information handling system front face as the viewing angle changes. The visually dynamic effect may be enhanced by contrasting colors included in the layers. For instance, outer layer 30 and inner layer 34 may be manufactured from a dark or greyish pigmented material that blends visually while middle layer 32 is manufactured from a vibrant pigment, such as a bright blue, that contrasts with outer layer 30 and inner layer 34. Although the example embodiment has a common color for outer layer 30 and inner layer 34, in alternative embodiments different colors may be used and middle layer 32 may have different colors for each pattern and/or at different locations across the surface. Further, first and second patterns may have different shapes, such as varied spacing of lines and perimeter sizes for geometric features, as well having the patterns distributed over only part of each layer. The visual effects may also be varied based upon varied spacing between the different layers, which impacts how the middle and inner layers become visible at different viewing angles. In the example embodiment, the dynamically visual effect is passive without any active interactions with the information handling system, however, in alternative embodiments, the visual effect may be further enhanced with active implementations, such as LED illumination integrated in bezel 14 and controlled by the processing components.

Figure 3:
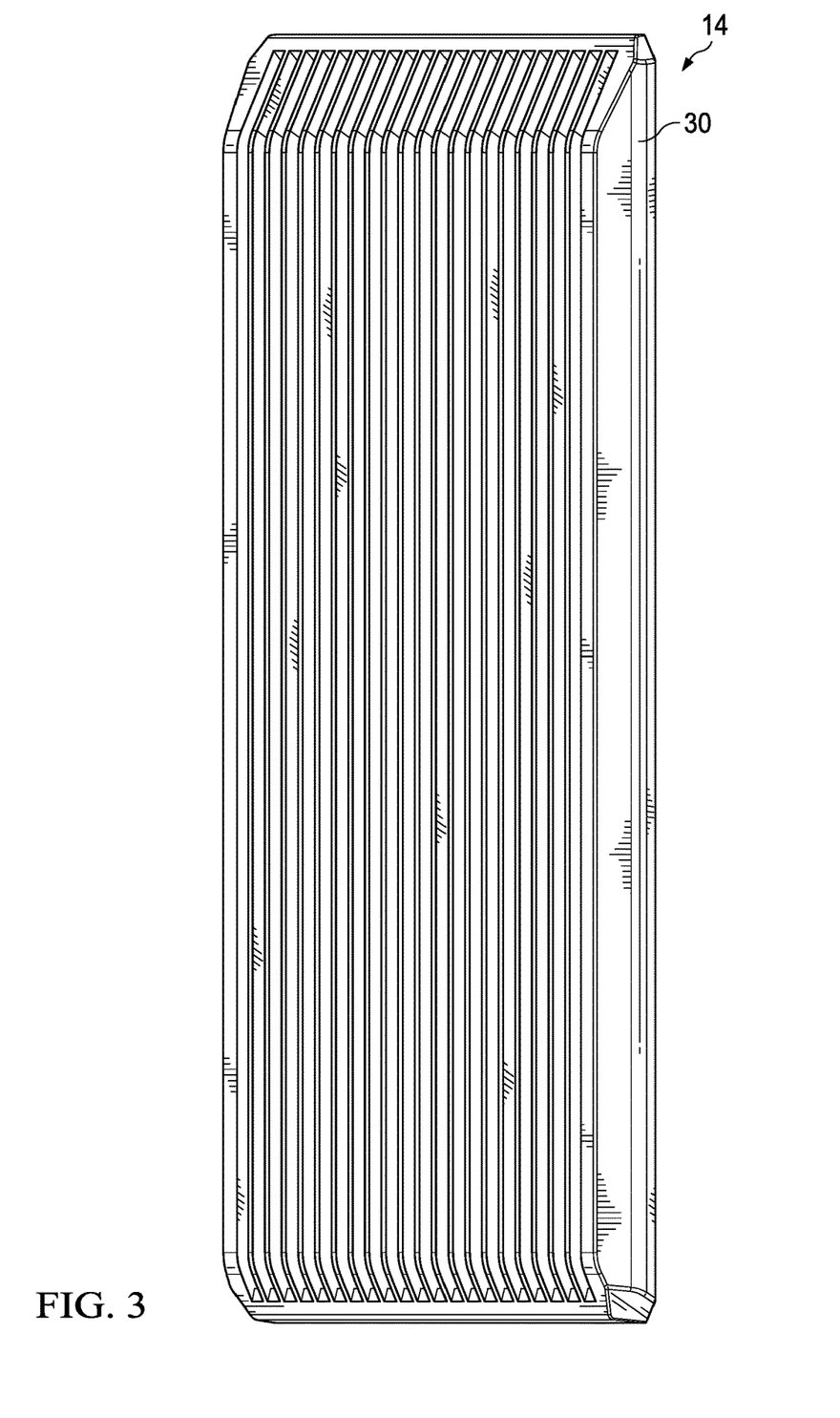
FIG. 3 depicts a side perspective view of the bezel having the middle and inner layers hidden.
Figure 4:
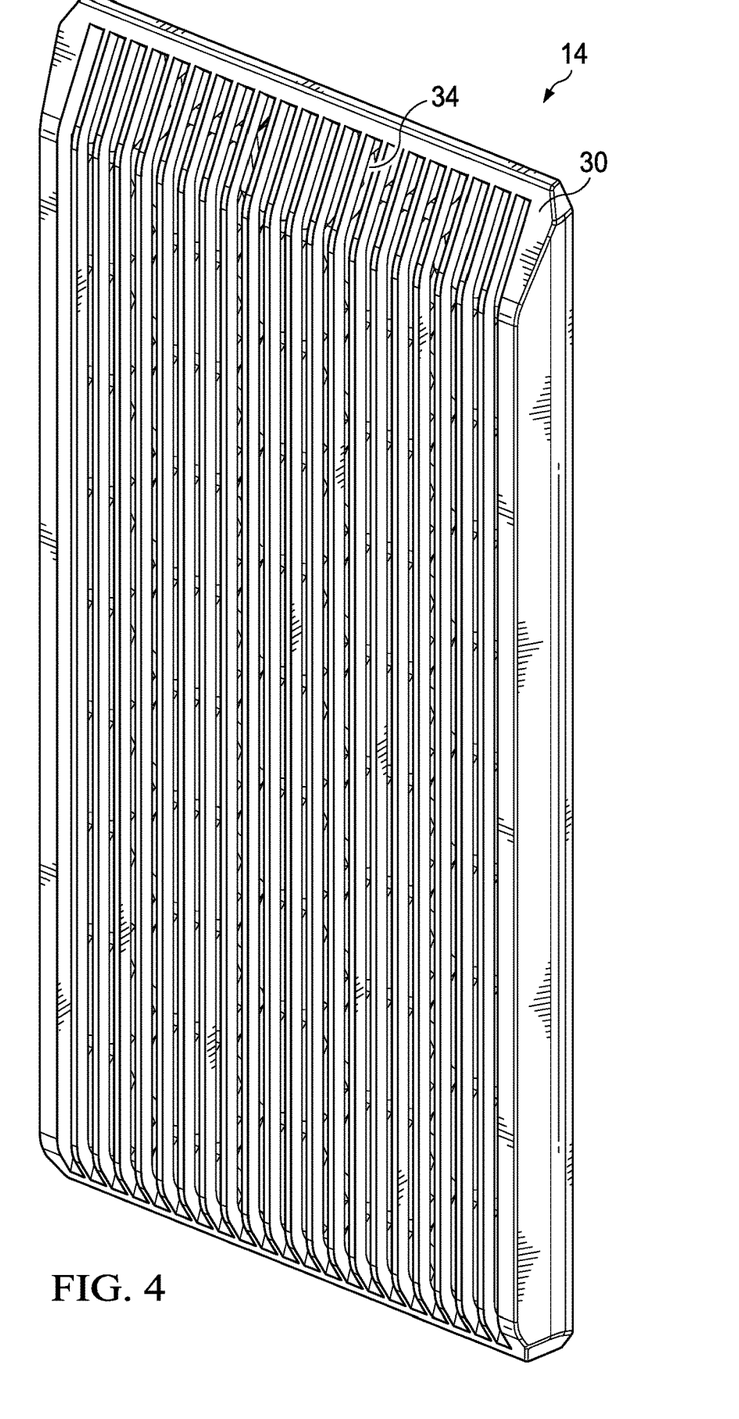
FIG. 4 depicts an upper side perspective view of the bezel having the inner layer pattern visible.
Figure 5:
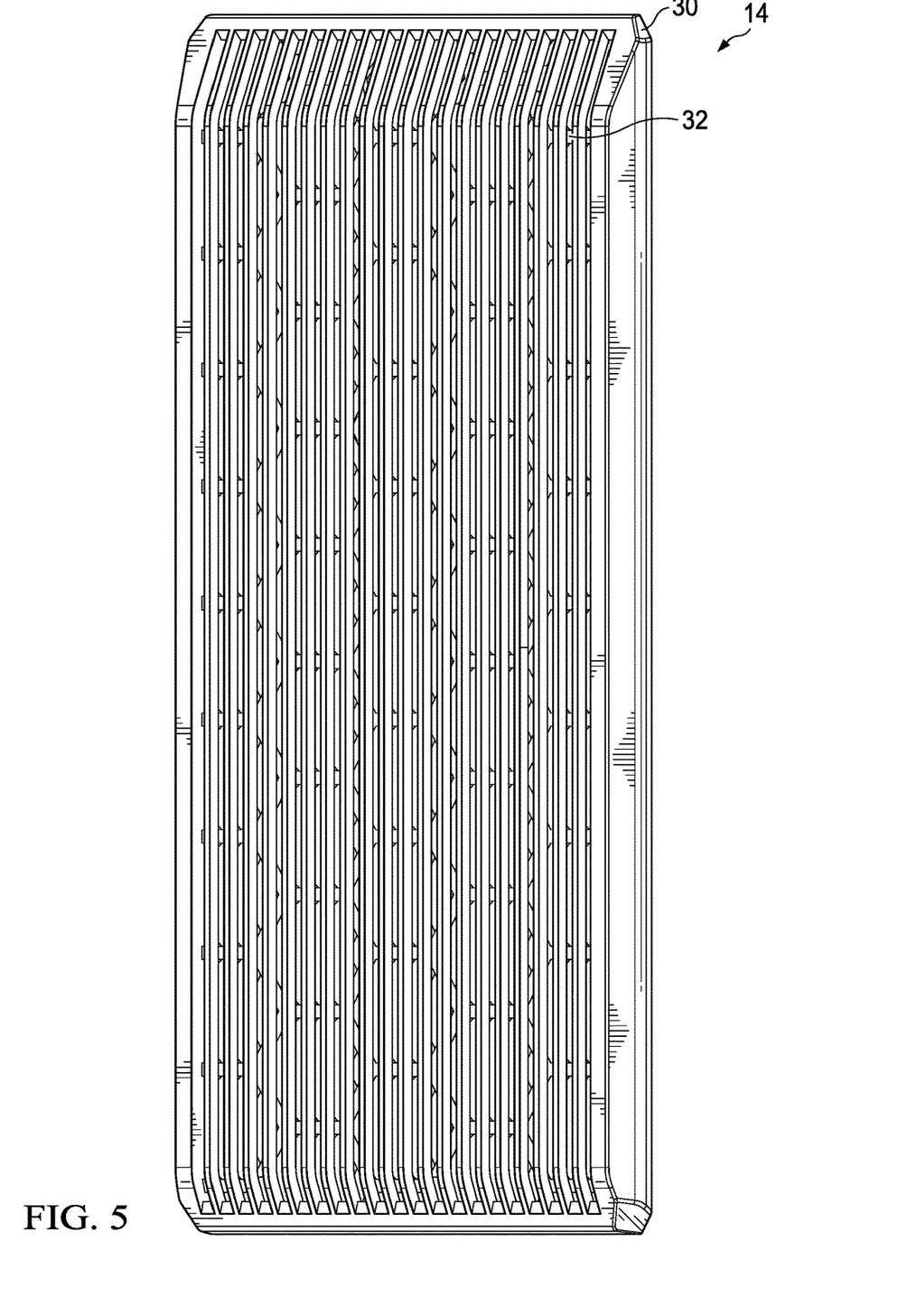
FIG. 5 depicts a side perspective view of the bezel having the middle layer and inner layer dynamically adjusting the bezel appearance as an end user viewing angle moves towards perpendicular.
Figure 6:
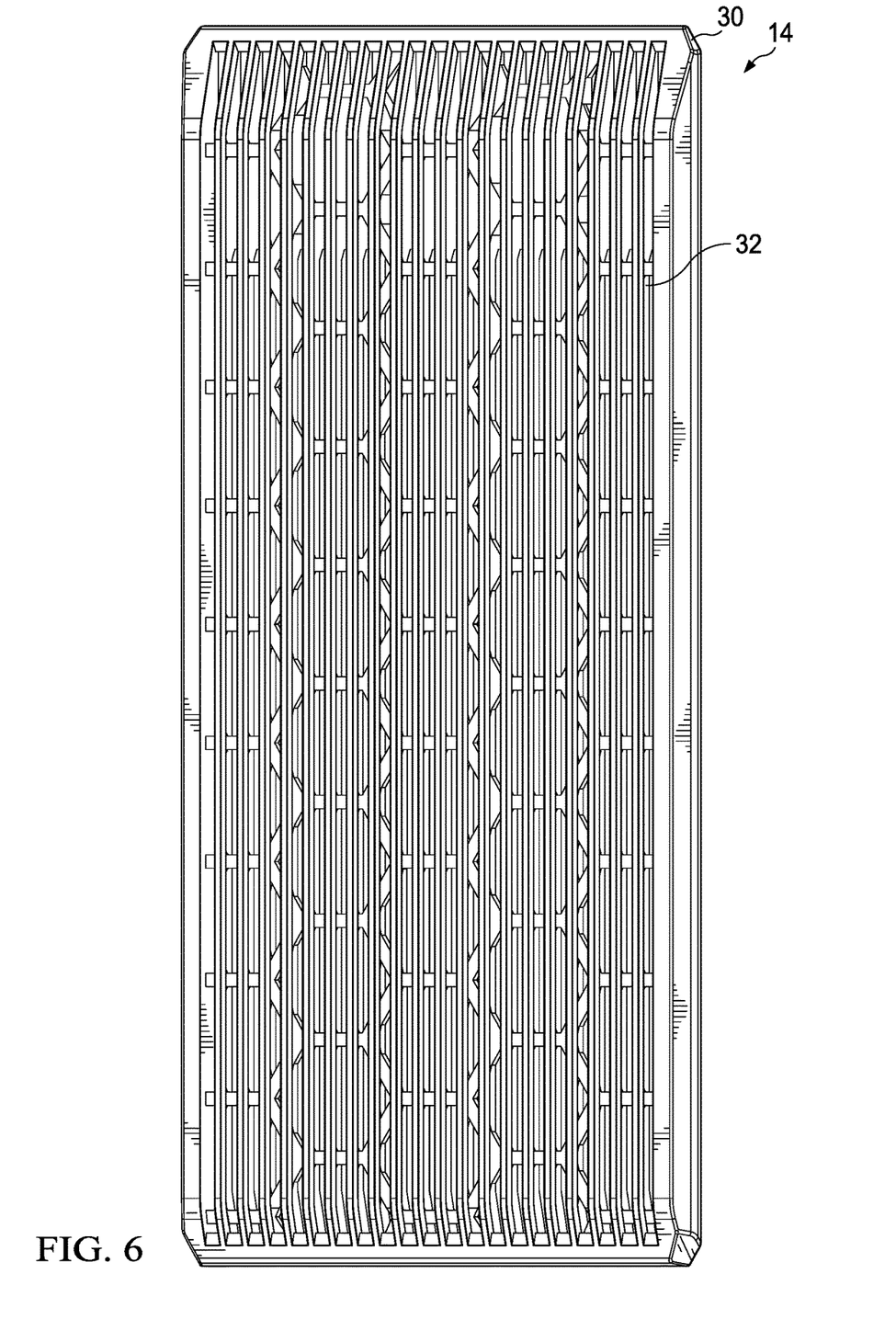
FIG. 6 depicts a front slightly offset from perpendicular view of the bezel having the middle layer geometric shape gaining in prominence relative to a side view.
Figure 7:
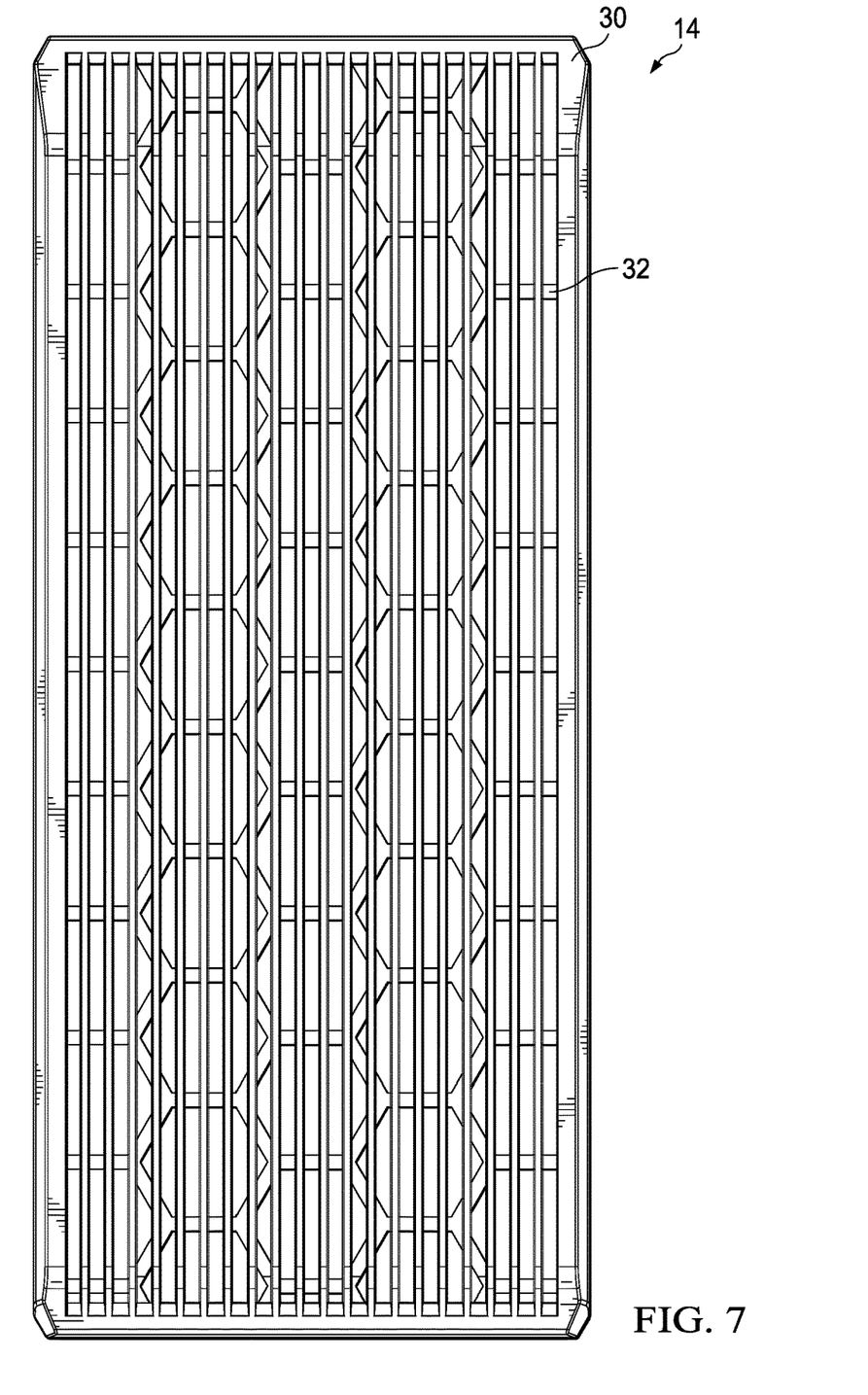
FIG. 7 depicts a front view of the bezel at a perpendicular viewing angle having geometric shapes of the inner layer hidden by the middle layer.
Figure 8:
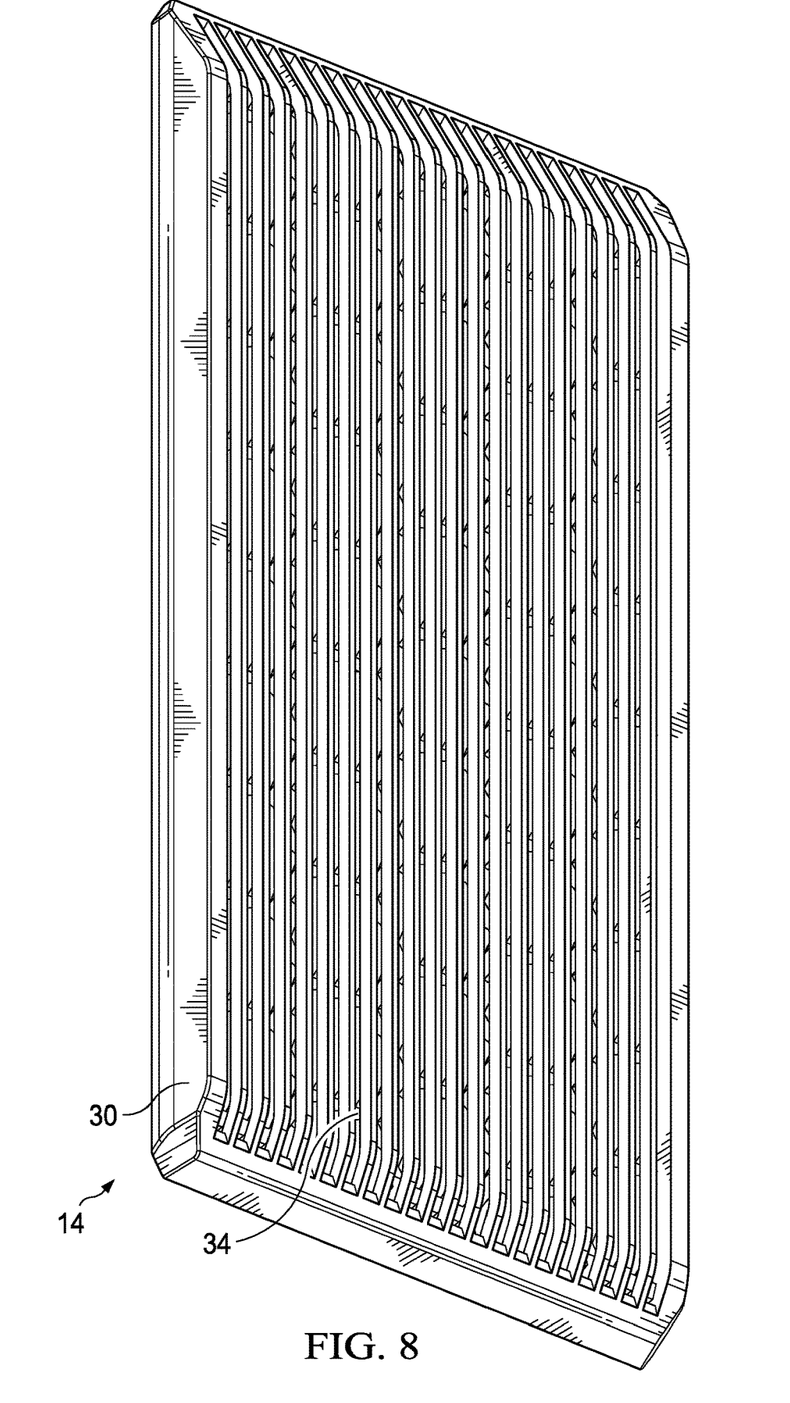
FIG. 8 depicts a lower perspective of the bezel offset from a perpendicular viewing angle at a side opposite from FIGS. 3-6.

Referring now to FIGS. 3 through 8, a variety of viewing angles of bezel 14 are depicted that illustrate the dynamic visual effect provided by interactions of the three layers. FIG. 3 depicts a side view of bezel 14 having a viewing angle at which the first pattern of outer layer 30 effectively blocks viewing of underlying layers. For example, the parallel vent lines of the first pattern have a depth that overlaps at greater than a predetermined viewing angle so that the sides of the vent lines are visible while hiding material below. At the upper perspective viewing angle of FIG. 4, material behind the parallel vent lines becomes visible as the viewing angle movement towards perpendicular provides a line of sight towards the middle and inner layers. Blue pigment of the middle layer vertical vent lines acts in contrast to highlight hexagons of the inner layer 34 so that the dark hexagons come into view. FIG. 5 depicts further movement towards a perpendicular viewing angle so that blue pigment of the middle layer 32 hexagon pattern highlights darker hexagon patterns from the underlying inner layer. As the viewing angle approaches perpendicular in FIG. 6, the sides of the vertical line pattern of middle layer 32 provides a blue background along with the blue hexagons so that the dark hexagons inner layer stand out in stark contrast. In FIG. 7, from directly perpendicular viewing angle, the dark vertical parallel line pattern of outer layer 30 covers the blue vertical lines of middle layer 32 while the blue hexagons are visible and cover the dark hexagons underneath on the inner layer. FIG. 8 illustrates that the visually dynamic effect is provided as the viewing angle shifts to the opposite point of view in a symmetric manner. In alternative embodiments, the dynamic effect may be further adjusted by changing the relative depth relationship of the patterns to change which visual elements of the middle and inner layers become visible as viewing angle changes.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a front side;
processing components disposed in the housing and operable to cooperate to execute instructions that process information; and
a bezel removeably coupled to the housing front side, the bezel having an outer layer having a first pattern coupled to an inner layer having a second pattern, the second pattern different than the first pattern, and a middle layer disposed between the inner and outer layers, the middle layer having both the first and second patterns aligned to have the second pattern appear visually dynamic based upon a viewing angle of the bezel.

2. The information handling system of claim 1 wherein:
the first pattern comprises plural parallel vent slots; and
the second pattern comprises plural geometric shapes.

3. The information handling system of claim 2 wherein the plural geometric shapes comprise plural hexagons.

4. The information handling system of claim 3 wherein the hexagon geometric shapes of the inner layer fade from view as a viewing angle towards the bezel changes from off-perpendicular towards perpendicular.

5. The information handling system of claim 4 wherein the plural vent slots of the outer layer and middle layer align over each other, and the plural geometric shapes of the inner layer and middle layer align over each other.

6. The information handling system of claim 5 wherein the middle layer is blue.

7. The information handling system of claim 6 wherein the inner and outer layers are black.

8. The information handling system of claim 1 wherein the middle layer has a color different from the inner and outer layers.

9. The information handling system of claim 8 wherein:
the middle layer color comprises blue; and
the inner and outer layer color comprises black.

10. A method for generating visually dynamic effects at an information handling system bezel, the method comprising:
coupling a bezel to the information handling system, the bezel having an outer layer having a first pattern, an inner layer having a second pattern different than the first pattern and a middle layer having both the first and second pattern;
providing a first visually dynamic effect from a perpendicular viewing angle relative to the bezel by blocking viewing of the first pattern of the middle layer with an aligned first pattern of the outer layer; and
providing a second visually dynamic effect from an off-perpendicular viewing angle to the bezel by highlighting viewing of the second pattern of the inner layer with misaligned first pattern of the middle layer and outer layer.

11. The method of claim 10 wherein:
the first pattern comprises vertical spaced parallel lines; and
the second pattern comprises geometric shapes.

12. The method of claim 11 wherein the geometric shapes comprise hexagons.

13. The method of claim 11 the highlighting viewing comprises:
forming the middle layer from a material of a first color; and
forming the second layer from a second color that contrasts against the first.

14. The method of claim 13 wherein:
the first color is blue; and
the second color is black.

15. The method of claim 10 further comprising:
adjusting the visually dynamic effects by adjusting a spacing between the outer, inner and middle layers.

16. A bezel comprising: an outer layer having a first pattern; an inner layer having a second pattern different than the first pattern; and a middle layer having both the first and second patterns, wherein: the inner and outer layers have a first color; and the middle layer has a second color that contrasts against the first color to provide a dynamic visual effect of the second pattern based upon a viewing angle to the outer layer, wherein the first pattern comprises spaced lines, the outer and middle layer spaced lines aligned along an axis perpendicular to the outer layer, and wherein the second pattern comprises plural geometric shapes, the inner and middle layer geometric shapes aligned along an axis perpendicular to the outer layer.

17. The bezel of claim 16 wherein the geometric shape is a hexagon.

* * * * *